United States Patent [19]

Pons et al.

[11] Patent Number: 5,304,395
[45] Date of Patent: Apr. 19, 1994

[54] METHOD FOR COATING INORGANIC AND ORGANIC PIGMENT OR COLORANT PARTICLES WITH A PLASTIC DISPERSION

[75] Inventors: Dick A. Pons, Maassluis; Monique van der Berg, Zwolle, both of Netherlands

[73] Assignee: Stamicarbon B.V., Netherlands

[21] Appl. No.: 815,587

[22] Filed: Dec. 31, 1991

Related U.S. Application Data

[62] Division of Ser. No. 642,311, Jan. 18, 1991, abandoned.

[30] Foreign Application Priority Data

Jan. 26, 1990 [NL] Netherlands ........................ 9000194

[51] Int. Cl.$^5$ .............................................. B01J 13/02
[52] U.S. Cl. .................... 427/213.3; 428/403; 526/287
[58] Field of Search ............................ 427/213.3, 221

[56] References Cited

U.S. PATENT DOCUMENTS 2,914,499 11/1959 Sheetz .
4,391,893 7/1983 Hendricks ........................ 427/221
4,661,557 4/1987 Bubam .

FOREIGN PATENT DOCUMENTS 842563 7/1960 United Kingdom .

OTHER PUBLICATIONS

Merkle, et al., "Surface Treatment of Organic Pigments" in Pigment Handbook; vol. III, (1973), pp. 157-167.
Netherlands Search Reports.
Pigment Handbook, vol. III, ed., Patton, T. p. 165 (1973).
European Search Report.

Primary Examiner—Christopher Henderson
Attorney, Agent, or Firm—Cushman, Darby & Cushman

[57] ABSTRACT

The invention relates to a plastic dispersion as coating for inorganic and organic particles, such as pigment particles and colourant particles.

The plastic dispersion is a dispersion of a polymer based on a. a vinyl monomer,
b. ($C_1$-$C_{12}$) alkyl(meth)acrylate, ($C_1$-$C_{12}$) dialkylitaconate, ($C_1$-$C_{12}$) dialkylfumarate and/or ($C_1$-$C_{12}$) dialkylmaleate,
c. a monomer containing sulphonic acid groups, or a corresponding salt of it, and
d. 0–0.3% (wt) organic unsaturated mono- and/or dicarboxylic acid.

1 Claim, No Drawings

METHOD FOR COATING INORGANIC AND ORGANIC PIGMENT OR COLORANT PARTICLES WITH A PLASTIC DISPERSION

This is a division of application Ser. No. 07/642,311, filed on Jan. 18, 1991, now abandoned.

BACKGROUND OF THE INVENTION

The invention relates to the use of a plastic dispersion as coating for inorganic and organic particles, such as pigment particles and colourant particles.

The use of plastic dispersions as coatings for inorganic and organic particles, such as pigment particles and colourant particles, is described on page 165 of the Pigment Handbook (Volume III, by Temple C. Patton, 1973). Such pigment particles or colourant particles coated with plastic dispersions can be mixed into various plastics After mixing with plastics, such coated pigment particles often cause problems owing to the formation of agglomerates. In general the coated pigment particles are suited only for mixing with highly specific plastics That is why plastic dispersions are sought resulting in a good homogeneous distribution of pigments and colourants in a plurality of plastics without agglomerates being formed

SUMMARY OF THE INVENTION

The invention is characterized in that the plastic dispersion is a dispersion of a polymer based on
(a) a vinyl monomer,
(b) ($C_1$–C12) alkyl(meth)acrylate, ($C_1$–$C_{12}$) dialkylitaconate, ($C_1$–$C_{12}$) dialkylfumarate and/or ($C_1$–C12) dialkylmaleate,
(c) a monomer containing sulphonic acid groups, or a corresponding salt of it, and
(d) 0–0.3% (wt) organic unsaturated mono- and/or dicarboxylic acid.

Pigment particles and colourant particles coated with the plastic dispersion of the present invention can be mixed with many differenti types of plastics which include, but are not limited to polystyrene, ABS, PVC, polyesters, polyethylene, polypropylene, polyethylene therephthalate and polycarbonate without resulting in the formation of agglomerates.

DETAILED DESCRIPTION OF THE INVENTION

The plastic dispersion is preferably a dispersion of a polymer based on
(a) 50–99% (wt) vinyl monomer,
(b) 0–50% (wt) ($C_1$–$C_{12}$) alkyl(meth)acrylate, ($C_1$–$C_{12}$) dialkylitaconate, $C_1$–$C_{12}$) dialkylfumarate and/or ($C_1$–$C_{12}$) dialkylmaleate,
(c) 0.1–5% (wt) monomer containing sulphonic acid groups, or a corresponding salt of it and
(d) 0–0.3% (wt) organic unsaturated mono and/or dicarboxylic acid.

According to a preferred embodiment of the invention the plastic dispersion is a dispersion of a polymer based on
(a) a vinylaromatic monomer,
(b) ($C_1$–$C_{12}$) alkyl(meth)acrylate,
(c) sulpho ($C_1$–$C_{12}$) alkyl(meth)acrylate, or a corresponding salt of it and
(d) 0–0.3% (wt) unsaturated mono and/or dicarboxylic acid.

According to a further preferred embodiment the plastic dispersion is a dispersion of a polymer based on
(a) 50–99% (wt) vinylaromatic monomer,
(b) 0–50% (wt) ($C_1$–$C_{12}$) alkyl(meth)acrylate, ($C_1$–$C_{12}$) dialkylitaconate, ($C_1$–$C_{12}$) dialkylfumarate, and/or ($C_1$–$C_{12}$) dialkylmaleate,
(c) 0.1–5% (wt) sulpho ($C_1$–$C_{12}$) alkyl(meth)acrylate, or a corresponding salt, and
(d) 0–0.3% (wt) unsaturated mono and/or dicarboxylic acid.

The vinyl monomer can, for instance, be a vinylaromatic monomer, vinylacetate, vinylversatate, vinylaurate or vinylcaprate. However, these examples are not intended to limit the scope of the invention. Preference is given to the use of a vinylaromatic monomer such as, for instance, styrene. Other suitable vinylaromatic monomers include, for instance, vinyltoluene and α-methylstyrene.

The preferred component (b) is ($C_1$–$C_{12}$) alkyl(meth)acrylate.

($C_1$–$C_{12}$) alkyl(meth)acrylate is preferably methyl(meth)acrylate. Other non-limiting examples of suitable ($C_1$–$C_{12}$) alkyl(meth)acrylates include, but are not limited to, ethyl(meth)acrylate, butyl(meth)acrylate and 2-ethyl-hexyl(meth)acrylate According to a preferred embodiment of the invention, the percentage by weight of organic unsaturated mono- and/or dicarboxylic acid is substantially 0% (wt).

If organic unsaturated mono or dicarboxylic acid is present, it is preferably (meth)acrylic acid.

Monomers containing suitable sulphonic acid groups include, but are not limited to, sulpho ($C_1$–$C_{12}$) alkyl(meth)acrylates, sulpho ($C_1$–$C_{12}$) dialkylmaleates, sulpho ($C_1$–$C_{12}$) dialkylfumarates, sulpho ($C_1$–$C_{12}$) alkylitaconates, sodiumvinylsulphonate, styrenesulphonate and/or acrylamidoalkanesulphonic acid.

The salts applied are preferably ammonium, potassium, sodium or amine salts. However, these examples are not intended to limit the scope of this invention.

Sulpho ($C_1$–$C_{12}$) alkyl(meth)acrylates are preferably used as component (c).

As sulpho ($C_1$–$C_{12}$) alkyl(meth)acrylate, sulphopropyl(meth)acrylate and/or sulphoethyl(meth)acrylate are preferably used.

Suitable sulpho($C_1$–$C_{12}$)alkyl(meth)acrylates include, but are not limited to 2-sulpho α-ethylacrylate, 2-sulpho α-propylacrylate, 2-sulphoethyl α-butylacrylate, 2-sulphoethyl α-hexylacrylate, 2-sulphoethyl α-cyclohexylacrylate, 2-sulpho α-chloroacrylate, 1-sulpho-2-propyl(meth)acrylate, 2-sulpho-1-butyl(meth)acrylate, 1-sulpho-2-butyl(meth)acrylate, 3-sulpho-2-butyl(meth)acrylate, 2-methyl-2-sulpho-1-propyl(meth)acrylate, 2-methyl-1-sulpho-2-propyl(meth)acrylate, 3-bromo-2-sulpho-1-propylacrylate, 3-bromo-1-sulpho-2-propylacrylate, 3-chloro-2-sulpho-1-propylacrylate, 3-chloro-1-sulpho-2-propylacrylate, 1-bromo-3-sulpho-2-butylacrylate, 1-bromo-2-sulpho-3-butylacrylate, 1-chloro-3-sulpho-2-butylacrylate, 1-chloro-2-sulpho-3-butylacrylate, 3-bromo-2-sulpho-1-butylacrylate, 3-bromo-1-sulpho-2-3-chloro-2-sulpho-1-butylacrylate,
3-chloro-1-sulpho--2-butylacrylate, 1-chloro-2-methyl-3-sulpho-2-propylacrylate, 1-chloro-2-methyl-2-sulpho-3-propylacrylate, 1-chloro-2(chloromethyl)-3-sulpho-2-propylacrylate, 1-chloro-2-(chloromethyl)-2-sulpho-3-propylacrylate, 3-methoxy-2-sulpho-1-propylacrylate, 3-methoxy-1-sulpho--2-propylacrylate, 2-sulphocyclohexylacrylate, 2-phenyl-2-sulphoethylacrylate, 1- phenyl-2-sulphoethyl-acrylate, 3-sulpho-1-propylacrylate, 3-sulpho-1-butylacrylate, 4-sulpho-1-butylacrylate, sulphophenylacrylate, sulphophenylmethacrylate and 2-(sulphophenoxy)ethylacrylate.

The preparation of such sulpho($C_1$–$C_{12}$)alkyl(meth)acrylates is described in U.S. Pat. No. 2,923,734.

Suitable acrylamidoalkanesulphonic acids include, but are not limited to acrylamidopropanesulphonic acid, acrylamido-2-tetradecanesulphonic acid, acrylamido-2-dodecanesulphonic acid and acrylamido-2-decanesulphonic acid.

The plastic dispersions may be aqueous or non-aqueous. Preference is given to the use of aqueous dispersions.

The plastic dispersions can be obtained by any suitable means, such as by generally known emulsion polymerization techniques.

Dispersions based on sulphoalkylacrylates are described on, for instance, page 535 of 'Functional Monomers', (Volume 1, Ronald H. Yocum and Edwin B. Nyquist, 1973).

The molecular weights of the dispersions can be analyzed by means of GPC, in which analysis the polymers are dissolved in tetrahydrofuran and filtered off over an 0.45 micrometre filter.

Three linear columns are used with polystyrene as standard. The dispersions usually show a substantially gauss molecular weight distribution, the distribution being asymmetric with a range between 25,000 and 150,000 g/mole for the top of the greatest peak (calibrated with respect to narrow polystyrene standards). If the molecular weight is too high, the miscibility of the dispersion-coated pigment in plastics may be insufficient. In order to obtain the desired molecular weights, chain regulators such as, for instance, dodecyl mercaptan, carbon tetrachloride, n-butyl mercaptan and 2-mercaptoethanol may be necessary.

The plastic dispersion can be mixed with a pigment paste in a ball mill or in a high-speed mixer. In such an aqueous paste the pigment is contained in a finely distributed state with the desired particle size which is preferably less than 5$\mu$m. The mixture consisting of dispersion and pigment paste can be dried by spray drying to form a pigment powder. The mixture consisting of dispersion and pigment paste can also be heated, causing coagulation. If necessary, the resulting product will be filtered, washed, dried and/or ground.

In this manner the particle coated with a plastic dispersion can be obtained.

The amount of pigment by weight (based upon the amount of dispersion by weight) may range within wide limits. Preferably, the amount of pigment varies between 10 and 90% (wt) calculated based on the total weight of coated pigment by weight. If inorganic pigments are used, the amount is usually 50-75% (wt) pigment and 25-50% (wt) dispersion. If organic pigments are used, the amount is usually 25-35% (wt) pigment and 65-75% (wt) dispersion.

If so desired, additives such as, for instance, metallic soaps, low molecular weight polymers, waxes and/or liquid esters of dicarboxylic acids may be used also in order to obtain virtually dust-free, easy-to-use and easy-to-meter products (masterbatches). Non-limiting examples of suitable metallic soaps are magnesium, calcium and zinc stearate. Examples of suitable liquid esters of dicarboxylic acids include the esters of aromatic dicarboxylic acids such as dioctylphthalate. Other suitable additives are, for instance, stearylamide, ethylenedistearylamide, silica, hydrogenated castor oil and/or esters of pentaerythritol such as a monoester or tetraester of pentaerythritol, for instance an ester of a fatty acid with 12 to 18 carbon atoms. The above additives are described, for instance, in EP-A-290092 and EP-A-379751.

The amount of coated pigment particles or colourant particles usually ranges between 0.1 and 20% (wt) calculated based on the weight of the plastic. Suitable plastics include, but are not limited to, polystyrene, ABS, PVC, polyethyleneterephtalate polyesters, polyethylene, polypropylene and polycarbonate.

The invention also comprises the mixtures based on these plastics and the coated organic and inorganic particles.

The pigments and dispersions coated according to the invention can be used also in powder coatings, rubbers, insecticides, pharmaceutical products, paints, foodstuffs, printing inks, films, laminates, and the like.

The pigment particles and colourant particles may be of an organic as well as an inorganic nature. The particle size is mostly between 0.01 $\mu$m and 100 $\mu$m.

Examples of suitable inorganic pigments include, but are not limited to $TiO_2$, $ZnO$, $Sb_2O_3$, $ZrO$, $BaSO_4/ZnS$, $TiO_2/CaSO_4$, $TiO_2/BaSO_4$, $Pb_3O_4$, $CdS(Se)$, $Sb_2S_3$, $HgS$, $PbCrO_4$, $PB(OH)_2$, $BaCrO_4$, $SrCrO_4$, $PbCrO_4$, $PbO$, $Cr_2O_3$, $Ca_3(PO_4)_2$, $Fe_4((Fe(CN)_6)_3$, $CaO.CuO.4SiO_2$, $CuO.Al_2O_3$, 'metallic' pigment and carbon black.

Suitable organic pigments include, but are not limited to, azo compounds and ultramarine blue.

Suitable pigments and colourants are described, for instance, in EP-A-104498.

The invention is elucidated by means of the following non-restrictive examples.

EXAMPLE I

Preparation of a Plastic Dispersion

A flask (of 2 litres) provided with a cooler, thermocouple and stirrer was filled with 62 parts by weight demineralized water and 0.04 parts by weight sodiumdodecylbenzenesulphonate.

This mixture was brought to 80° C.

Subsequently were added 0.35 part by weight ammoniumpersulphate as initiator and a pre-emulsion consisting of 99 parts by weight styrene, 0.15 part by weight dodecyl mercaptan, 3.5 parts by weight sodiumdodecylbenzenesulphonate, 1 part by weight 3-sulphopropylmethacrylate (K salt) and 30 parts by weight demineralized water in a period of three hours.

After this addition in 15 minutes the temperature was raised to 85° C. During a period of one hour a solution of 0.15 gramme ammonium persulphate in 3.1 grammes demineralized water was added. After 2 hours at 85° C. the flask was cooled, filtered and drained.

EXAMPLE II

The process according to Example I was repeated, with 20 parts by weight methylmethacrylate and 79 parts by weight styrene (instead of 99 parts by weight styrene) being incorporated.

EXAMPLE III

The process according to Example I was repeated, with 20 parts by weight butylacrylate and 97 parts by weight styrene (instead of 99 parts by weight styrene) being incorporated.

COMPARATIVE EXPERIMENT A

The process according to Example I was repeated, with 2 parts by weight acrylic acid and 97 parts by weight styrene (instead of 99 parts by weight styrene) being incorporated.

COMPARATIVE EXPERIMENT B

The process according to Example I was repeated, with 3 parts by weight methacrylic acid and 96 parts by weight styrene (instead of 99 parts by weight styrene) being incorporated.

TABLE I

| | \multicolumn{5}{c}{Dispersion according to} | | | | |
|---|---|---|---|---|---|
| | I | II | III | A | B |
| | \multicolumn{5}{c}{parts by weight} | | | | |
| demineralized water | 62 | 62 | 62 | 62 | 62 |
| sodiumdodecylbenzenesulphonate | 0.04 | 0.04 | 0.04 | 0.04 | 0.04 |
| styrene | 99 | 79 | 79 | 97 | 96 |
| methylmethacrylate | | 20 | | | |
| butylacrylate | | | 20 | | |
| acrylic acid | | | | 2 | |
| methacrylic acid | | | | | 3 |
| dodecyl mercaptan | 0.15 | 0.15 | 0.15 | 0.15 | 0.15 |
| sodiumdodecylbenzenesulphonate | 3.5 | 3.5 | 3.5 | 3.5 | 3.5 |
| 3-sulphopropylmethacrylate(K salt) | 1 | 1 | 1 | 1 | 1 |
| demineralized water | 30 | 30 | 30 | 30 | 30 |

EXAMPLE IV

Preparation of a Pigment Paste 3.85 parts by weight propylene glycol, 1.40 parts by weight water, 0.85 part by weight dispersant (Orotan 731 SD, 25% wt. solution, Rohm and Haas), 0.10 part by weight dispersant (Surfynol 104E, Air Products), 0.10 part by weight antifoamer (Agitan 703, Munzing Chemie) and 19.70 parts by weight titanium dioxide (Kronos 2190, Kronos Titan) were mixed and, using a ball mill or pearl mill, ground to a Hegman fineness lower than 5.

EXAMPLE V

Preparation of a Pigment Paste 125 parts by weight water, 20 parts by weight ethylene glycol, 45 parts by weight dispersant (SER AD FA 620, Servo) and 235 parts by weight pigment (Helio Blue 6900) were brought to a particle size of less than 5 $\mu$m by means a ball mill. To the above mixture were subsequently added 200 parts by weight styreneacrylate dispersion (50% wt. water), 5 parts by weight calciumstearate dispersion (50% wt. water) and 25 parts by weight 2% hydroxyethyl cellulose solution, and the mixture was well stirred. This pigment paste was subjected to spray drying and contained 65% Helio Blue (dry on dry).

EXAMPLE VI 50 parts by weight of 50% aqueous solutions of the plastic dispersions according to Examples I-III and Comparative Experiments A-B were mixed in a high-speed mixer with 83 parts by weight pigment paste according to Example IV. The result was that $TiO_2$ was coated with the dispersion.

EXAMPLE VII 10 parts by weight of the $TiO_2$ coated according to Example VI were mixed in an extruder with 20 parts by weight polycarbonate.

A visual analysis revealed that $TiO_2$ coated with dispersions according to any one of Examples I-III showed a good homogeneous distribution of pigment in the polycarbonate.

On the other hand, the experiments based on $TiO_2$ coated with dispersions according to any one of Comparative Experiments A-B resulted in many agglomerates.

EXAMPLE VIII 50 parts by weight of 50% aqueous solutions of plastic dispersions according to Examples I-III and Comparative Experiments A-B were mixed in a high-speed mixer with 106 parts by weight of this pigment paste according to Example V, 1.25 parts by weight calcium stearate 50% and 6.25 parts by weight 2% hydroxyethyl cellulose solution. The result was that the pigment was coated with the dispersions. Subsequently, this mixture was dried by spray drying to form a dust-free powder.

EXAMPLE IX 10 parts by weight of the pigment coated according to Example VIII were mixed in an extruder at 150° C. with 200 parts by weight polystyrene.

A visual determination revealed that 'helio blue' coated with dispersions according to any one of Examples I-III showed a good homogeneous distribution in the polystyrene.

On the other hand, the experiments with 'helio blue' coated with dispersions according to any one of Comparative Experiments A-B resulted in many agglomerates.

We claim:

1. A method of coating pigment or colorant particles consisting essentially of:
   i) forming a plastic dispersion comprising a polymer based on
      a) a vinyl aromatic monomer,
      b) ($C_1$–$C_{12}$) alkyl(meth)acrylate, ($C_1$–$C_{12}$) dialkylitaconate, ($C_1$–$C_{12}$) dialkylfumarate, ($C_1$–$C_{12}$) dialkylmaleate and a mixture thereof,
      c) a monomer containing sulphonic acid groups, or a corresponding salt of said monomer,
      d) 0–0.3% (wt) organic unsaturated monocarboxylic acid, dicarboxylic acid and a mixture thereof; and
   ii) mixing said particles with said dispersion in order to form coated particles.

* * * * *